United States Patent

[11] 3,600,591

[72] Inventors Richard Thier
Buderich near Dusseldorf;
Heinz Voigt, Bielefeld, both of, Germany
[21] Appl. No. 2,502
[22] Filed Jan. 13, 1970
[45] Patented Aug. 17, 1971
[73] Assignee Feldmuhle Aktiengesellschaft
Dusseldorf, Germany

[54] APPARATUS FOR DETECTING SURFACE ELEVATIONS ON A MOVING SHEET
5 Claims, 2 Drawing Figs.
[52] U.S. Cl. ..................................................... 250/219 DF,
250/227, 356/237
[51] Int. Cl. ....................................................... G01n 21/32
[50] Field of Search.......................................... 356/237;
250/219 DF, 227; 356/199, 200, 237—239

[56] References Cited
UNITED STATES PATENTS
3,105,152  9/1963  Nash .............................. 250/239
3,334,239  8/1967  Nash .............................. 250/219
3,430,055  2/1969  Metzger ......................... 250/219
3,518,440  6/1970  Hanson et al. ................. 250/227

*Primary Examiner*—Walter Stolwein
*Attorney*—Kelman and Berman

ABSTRACT: Surface elevations such as wrinkles are detected in a moving, normally smooth-surfaced paper sheet by passing the sheet between a driven cylinder having a fixed axis of rotation and an idler cylinder yieldably biased toward the driven cylinder so as normally to define a continuous line of contact with the moving sheet. When a surface elevation causes a portion of the idler cylinder to be lifted from the moving sheet, light from a lamp on one side of the line of contact reaches transverse end faces of light conducting fibers arranged contiguously adjacent the other side of the line in a row parallel to the line. The fibers conduct the received light to photomultiplier tubes to generate an electric signal indicative of the magnitude and location of the surface elevation.

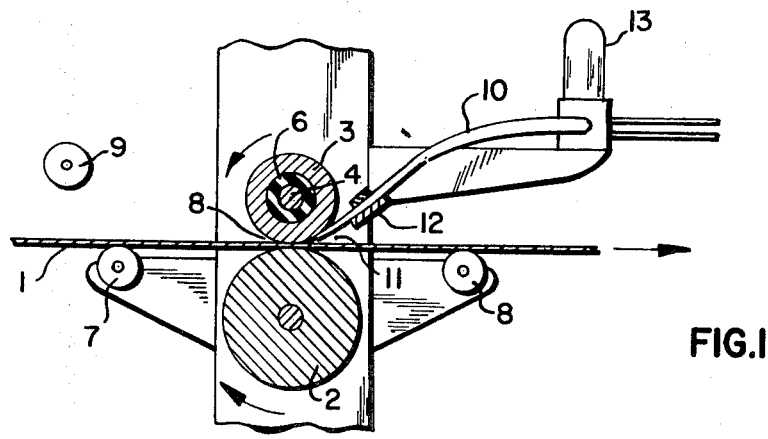
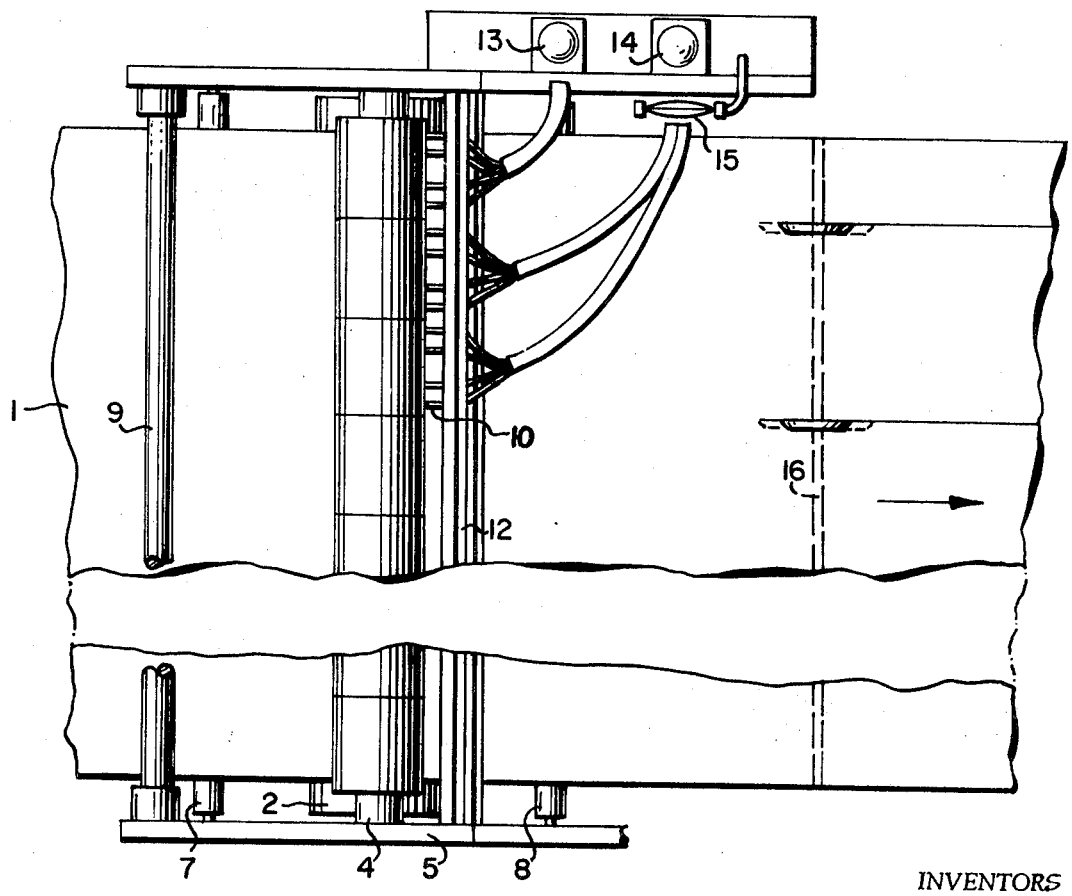
FIG.1
FIG.2
INVENTORS
RICHARD THIER & HEINZ VOIGT
BY Kelman and Berman
AGENTS

APPARATUS FOR DETECTING SURFACE ELEVATIONS ON A MOVING SHEET

This invention relates to the continuous inspection of moving sheet material, and particularly to the detection of surface elevations in sheets of normally smooth-faced material, such as paper.

This invention is more specifically concerned with an improvement in the detection system disclosed in Nash U.S. Pat. No. 3,105,152. It has been disclosed to bias a yieldably mounted light gate member toward the surface of a moving paper sheet in such a manner that a normally continuous line of contact between the member and the sheet surface extends transversely to the direction of sheet movement in the absence of unwanted surface elevations.

A light source illuminates one side of the line of contact whereas a detection apparatus including photoelectric cells is arranged for generating an electric signal in response to light emanating from the other side of the line of contact, the appearance of surface elevations in the moving sheet material at the line causing the light gate member to yield and move away from the paper surface, thereby interrupting the continuous contact and permitting light to reach the photoelectric cells. The increased output of the cells indicates the presence of the elevations on the paper sheet.

The intensity of a light beam decreases with the square of the distance from the light source. For good sensitivity of the known apparatus, it is essential that the photoelectric cells be mounted as closely as possible to the gap opening between the light gate member and the moving paper sheet in the event of a defect, and in line with the beam from the light source. This cannot be achieved without bending the path of the moving sheet in a usually undesirable manner.

Because of the dimensions of presently available photoelectric cells, such as photomultiplier tubes, and other structural features of the same, the full width of a moving paper sheet cannot be scanned by the cells unless the cells are spaced at a substantial distance from the line of normal contact and where the light intensity is relatively low.

It has been proposed in German Pat. No. 1,239,119 to overcome the shortcomings of the light detection system in the aforedescribed apparatus by arranging a rod of light-conducting polymethyl methacrylate parallel to the normal line of contact between the light gate member and the moving sheet, and to coat the face of the rod directed toward the gap with fluorescent material. The light passing a gap between the light gate member and the paper surface thus causes a secondary light emission into the acrylic rod from which it is transmitted to a photoelectric cell arranged at a longitudinal end of the rod.

This arrangement provides improved sensitivity, but is limited in its practical applications to paper sheets not much wider than one meter. A plastic rod spanning a horizontal sheet width of several meters tends to sag. It must be provided with suitable intermediate supports or have a relatively great cross-sectional area. The dimensions of the resulting structure are such that the rod cannot be placed as closely to the normal line of contact between the light gate member and the paper surface as would be necessary for adequate sensitivity of the apparatus without complex electronic circuitry associated with the photoelectric cell.

The object of the invention is the provision of a light detecting system in an apparatus of the general type described above which permits high sensitivity to be achieved in a simple manner.

In one of its basic aspects, the invention provides a plurality of elongated, light-transmitting fibers of transparent material, such as an optical grade of polymethyl methacrylate or glass fibers having a very high index of refraction, as are conventionally employed in fiber optics. Such fibers have each a longitudinal axis and longitudinally spaced first and second end faces transverse of the axis. The first end faces of the fibers are juxtaposed in the direction of the line of contact on the side of the line remote from the light source, and are directed toward the line for receiving light when the light gate member moves away from the surface. The second faces are directed toward one or more photoelectric cells, such as photomultiplier tubes, for transmitting the received light to the cells.

In such an arrangement, the first faces of the optical fibers can be brought as close to the line of contact as may be desired since the transverse dimensions of the fibers, as presently available as staple articles of commerce, are of the order of 40 to 70 microns. The fibers are still rigid enough to permit their free ends to project horizontally several centimeters beyond a support. Neither the dimensions of the fibers nor the dimensions of the support thus restrict the location of the light receiving first end faces. Transmission losses in the fibers are slight, and can be reduced to a minimum in a known manner by the provision of surface coatings of lower index of refraction. The length of each fiber between its end faces and the location of its light-emitting second end face thus are not critical, and a multiplicity of photocells may be associated with the fibers regardless of the dimensions of the photocells. Conversely, the second end faces of a multiplicity of fibers may be closely bunched and directed toward a single photoelectric cell either directly or through a positive lens which focuses the light transmitted from each fiber on a small area of the cell.

Other features, additional objects and many of the attendant advantages of this invention will become apparent from the following detailed description of a preferred embodiment when considered in connection with the appended drawing in which:

FIG. 1 shows apparatus of the invention in fragmentary side elevational section; and FIG. 2 illustrates the apparatus of FIG. 1 in plan view.

Only as much of a surface-elevation detecting apparatus has been shown in the drawing as is needed for an understanding of the invention, the basic principle of operation being known.

A continuous paper sheet 1 is moved longitudinally between a driven cylinder 2 and an idler cylinder 3. The horizontal axis of rotation of the cylinder 2 is fixed and parallel to the shaft 4 of the cylinder 3 which is mounted on the stationary machine frame 5 and supports the cylinder by means of resiliently mounted bushings 6 to reduce the biasing pressure of the cylinder 3 on the sheet 1 to a small value. The paper sheet 1 is guided into and out of the nip of the cylinders 2, 3 by idling guide rolls 7, 8 in a straight path. The cylinder 3 consists of several axial sections each of which is freely rotatable on an associated bushing 6.

A tubular lamp 9 is mounted on the frame 5 ahead of the cylinders 2, 3 above the paper sheet 1 in such a manner that its light falls on the continuous line of contact normally established between the cylinder 3 and the moving paper sheet.

A group of optical glass fibers 10 is associated with each axial section of the cylinder 3. The end faces of each fiber are polished, as is conventional in itself. The rear face is located in the wedge-shaped space 11 between the cylinder 3 and the sheet 1 remote from the lamp 9 at a distance from the aforementioned line of contact which is but a small fraction of the radius of the cylinder 3. The rear end faces of the fibers 10 in each group are juxtaposed in a row parallel to the line of contact, only a small number of the fibers being shown in FIG. 2 for the sake of clarity. The fibers are mounted on the frame 5 by means of a clamping bar 12 mounted at the wide end of the space 11, and project from the bar 12 toward the line of contact in a comblike arrangement.

The fibers 10 converge from the bar 12 in a direction away from the line of contact and are combined into strands which lead to photomultiplier tubes laterally offset from the sheet 1, only two tubes 13, 14 being indicated in FIG. 2. The tube 13 directly faces the front end faces of the fibers 10 associated with one section of the cylinder 3, the end faces being closely bunched. Two strands of fibers 10 associated with respective sections of the cylinder 3 have closely juxtaposed front end faces which transmit light received from a gap opening between the sheet 1 and the cylinder 3 to the sensitive portion of the tube 14 through a positive focusing lens 15.

The paper sheet 1 travels from the guide roll 8 to a slitter represented in FIG. 2 by rotary cutting blades 16. The slitter divides the sheet 1 into narrower strips respectively scanned by the several photomultiplier tubes only partly illustrated. A sorting mechanism, not shown and conventional in itself, is triggered by the output signal of each photomultiplier tube to reject a strip portion in which wrinkles or other unwanted surface elevations are present and have been detected by the opening of a gap between a section of the cylinder 3 and the moving paper sheet 1.

The aforedescribed apparatus has been found to detect wrinkles and other surface elevations in traveling paper sheets or webs with great sensitivity even when equipped with photomultiplier tubes or other photoelectric cells of relatively low sensitivity and with simple electronic output circuits, because of the relatively strong optical input signals transmitted practically without loss from the line of contact to the receiving surfaces of the tubes by the optical fibers.

A single photoelectric cell may be associated with a row of fibers stretching across the full width of a paper sheet if so desired, the output of the multiplicity of fibers being focused on the light receiving surface of the cell by a lens 15, and other modifications and variations of the illustrated apparatus will readily suggest themselves to those skilled in the art.

What We claim is:

1. In an apparatus for inspecting a moving sheet of normally smooth surfaced material, such as paper, including light-gate means including a light gate member arranged for yieldably contacting a surface of said sheet material, the line of contact of said member with said surface normally being continuous throughout the length thereof in the absence of unwanted surface elevations on said sheet material, said line extending in a direction transverse to the direction of motion of said material past said member, illumination means illuminating one side of said line of contact, and detection means, including photoelectric means for generating an electric signal in response to light emanating from the other side of said line of contact, the appearance of surface elevations at said line of contact causing said member to yield and move away from said surface, thereby interrupting said continuous contact and permitting light from said illuminating means to reach said photoelectric means, the improvement which comprises:

a. a plurality of groups of elongated, light-transmitting fibers of transparent material,
      1. each fiber having a longitudinal axis and longitudinally spaced first and second end faces transverse of said axis,
      2. said first end faces being juxtaposed in the direction of said line of contact on said other side of said line,
      3. the first end faces of the fibers in each group being directed toward an associated longitudinal section of said line for receiving light from said illumination means when the corresponding portion of said member moves away from said surface;
   b. said photoelectric means including a plurality of photoelectric cells, said second faces of said groups being directed toward said cells respectively.

2. In an apparatus as set forth in claim 1, said sections being coextensive in said transverse directions with respective strip portions of said moving sheet, and separating means for separating one of said portions from the remainder of said sheet in response to the electric signal generated by the photoelectric cell reached by light emanating from the other side of said line coextensive with the separated portion.

3. In an apparatus as set forth in claim 2, guide means guiding said material past said member in a planar path.

4. In an apparatus as set forth in claim 3, each of said second faces being laterally offset from said path in the direction of said line.

5. In an apparatus as set forth in claim 2, said light gate member having an axis of rotation substantially parallel to said line and being of circular cross section, the distance between each of said first end faces and said line being but a small fraction of the cross-sectional radius of said light gate member.